(12) United States Patent
Ganda et al.

(10) Patent No.: US 10,423,523 B2
(45) Date of Patent: Sep. 24, 2019

(54) AUTOMATED SELECTION OF TEST CASES FOR REGRESSION TESTING

(71) Applicant: CA, Inc., New York, NY (US)

(72) Inventors: Madhusudhan Ganda, Andhra Pradesh (IN); Kiran Kumar, Bangalore (IN); Sumit Gupta, Bangalore (IN); Pradeep Kumar Kanagaraj, Coimbatore (IN); Swapnel Shrivastava, Bangalore (IN); Narendra Dhulipalla, Telangana (IN); Ramanuja Charyulu, Los Gatos, CA (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 15/887,366

(22) Filed: Feb. 2, 2018

(65) Prior Publication Data

US 2019/0243751 A1    Aug. 8, 2019

(51) Int. Cl.
  *G06F 11/36* (2006.01)
  *G06F 3/0488* (2013.01)
  *G06F 3/0484* (2013.01)

(52) U.S. Cl.
  CPC ...... *G06F 11/3688* (2013.01); *G06F 11/3664* (2013.01); *G06F 11/3692* (2013.01); *G06F 3/04842* (2013.01); *G06F 3/04883* (2013.01)

(58) Field of Classification Search
  None
  See application file for complete search history.

(56) References Cited

U.S. PATENT DOCUMENTS

| | | | | |
|---|---|---|---|---|
| 5,761,408 A | * | 6/1998 | Kolawa | G06F 11/3676 714/38.1 |
| 6,421,822 B1 | * | 7/2002 | Pavela | G06F 11/3664 714/E11.208 |
| 8,276,123 B1 | * | 9/2012 | Deng | G06F 11/3688 714/37 |
| 8,490,067 B2 | * | 7/2013 | Boettcher | G06F 17/5022 717/124 |
| 8,793,656 B2 | * | 7/2014 | Huang | G06F 11/3688 717/124 |
| 9,361,211 B2 | * | 6/2016 | Gupta | G06F 11/3688 |
| 9,575,939 B2 | * | 2/2017 | Tuschner | G06F 17/2241 |

(Continued)

OTHER PUBLICATIONS

Chen, "Coverage-driven Automatic Test Generation for UML Activity Diagrams", 2008, ACM GLSVLSI'08, May 4-6, 2008, Orlando, Florida, USA. (Year: 2008).*

*Primary Examiner* — Hossain M Morshed

(57) ABSTRACT

Systems, methods and computer program products for performing software regression testing are provided. A sitemap comprising a hierarchy of nodes is displayed on a display, each node representing a block of source code for a program. An indication of a user selection of a plurality of nodes in the hierarchy is received. Responsive to receiving the indication, a lowest node of the nodes that is located at a lowest level of the hierarchy is determined and identified as a user selected node. A list of test cases to test the source code represented by the user selected node is displayed. Responsive to receiving an indication of a selection of one of the test cases in the list of test cases displayed, a message having an indication to execute the one of the test cases in the list of test cases displayed is transmitted, to a server device via a network.

19 Claims, 13 Drawing Sheets

(56) References Cited

U.S. PATENT DOCUMENTS

| | | | |
|---|---|---|---|
| 2006/0143570 A1* | 6/2006 | Washington | G06F 8/34 715/763 |
| 2011/0161938 A1* | 6/2011 | Marum | G06F 8/77 717/131 |
| 2012/0089964 A1* | 4/2012 | Sawano | G06F 11/3684 717/124 |
| 2018/0095867 A1* | 4/2018 | Varadarajan | G06F 11/3688 |

* cited by examiner

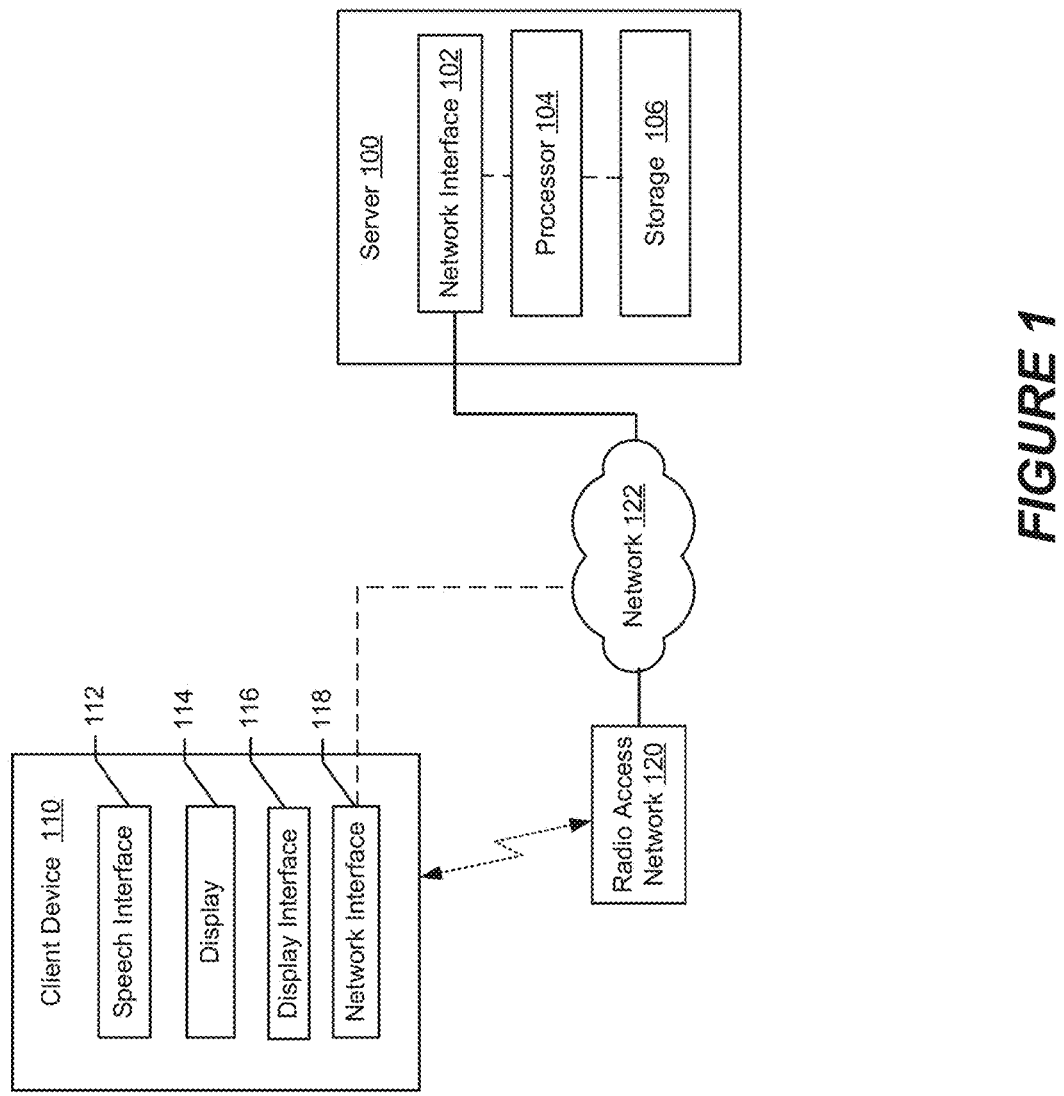

AUTOMATED SELECTION OF TEST CASES FOR REGRESSION TESTING

FIELD

Some embodiments described herein relate to software testing, and in particular to regression testing of software.

BACKGROUND

Various commercial and open-source tools exist to assist with the automation of test cases for software testing. The automation of test cases requires developing a comprehensive approach to test all of the functional areas that the software is deployed on. This may involve test cases invoked to fully test software applications. For example, one test case may be required to test a functional area such as a website user interface, whereas a separate test case may be required to automate CLI test case scenarios used in connection with the website. Likewise, if a user wants to implement testing of a Java application and a web service running components of this Java application, the user may build separate components to consume each of the Java application and the web service.

Once suitable test cases have been designed and selected, testing systems can execute the test cases using the application under test and verify the performance of the application under test.

Typically, software components are continually updated by their authors to provide new functionality, fix bugs, ensure interoperability with new versions of other software or operating systems, etc. It is desirable to test updated software components before the revisions are released to users.

Such testing, referred to as regression testing, is designed to identify if any new software bugs, or regressions, have been introduced into an application after the application has been changed. Regression testing may be further designed to determine whether a change in one part of the application has affected other parts of the application, which is a common occurrence.

Regression testing typically involves re-running the original test cases that were performed when the application was initially developed and checking to see whether any new faults have been introduced or previously fixed faults have re-emerged. It may not be necessary to execute all of the test cases against the application under test during regression testing, as not all of the test cases may invoke the changed source code. Thus, a large part of regression testing includes systematically selecting an appropriate set of tests needed to adequately cover a particular change.

Selecting regression tests based on changed portions of source code is time-consuming and error-prone as the user needs to go through the test case categories, test cases, etc., and review and select required regression tests. Thus, a user may still not be confident whether any required test has been selected or has been missed.

SUMMARY

Systems, methods and computer program products for performing software regression testing are provided. The systems, methods and computer program products are configured to display in a device having a display, a sitemap comprising a hierarchy of nodes on the display, each node representing a block of source code for a program, to receive an indication of a user selection of a plurality of nodes in the hierarchy of nodes displayed on the display, responsive to receiving the indication of the user selection of the plurality of nodes in the hierarchy of nodes on the display: to determine a lowest node in the plurality of the nodes that is located at a lowest level of the hierarchy of the nodes and to identify the lowest node as a user selected node, to display a list of test cases to be executed to test the block of source code represented by the user selected node, to receive an indication of a selection of one of the test cases in the list of test cases displayed, and to transmit, to a server device via a network, a message having an indication to execute the one of the test cases in the list of test cases displayed.

The systems, methods and computer program products for may be further configured to receive, from the server device via the network, a list of program test cases for the program, to determine for each node in the hierarchy of nodes, the list of test cases, from the list of program test cases, to be run when a change is made to source code associated with the node in the hierarchy of nodes, and responsive to receiving the indication of the user selection of the node, to display the list of test cases.

The systems, methods and computer program products may be further configured to receive, from the server device via the network, information on interfaces between blocks of the source code for the program, and to create, based on the information received, the sitemap comprising the hierarchy of nodes.

The display may comprise a touchscreen and receiving the indication of the user selection of the plurality of nodes in the hierarchy of nodes on the display may include detecting a user gesture on the touchscreen that at least partially encloses the plurality of the nodes.

Detecting the user gesture on the touchscreen that at least partially encloses the plurality of the nodes may include tracking a line drawn by the user via a mouse and or the touchscreen that at least partially encloses the one or more nodes.

Receiving the indication of the user selection of the plurality of nodes in the hierarchy of nodes on the display may include receiving a voice selection from the user indicating a path between at least two of the nodes and determining which plurality of nodes are in the path.

Receiving the indication of the user selection of the plurality of nodes in the hierarchy of nodes on the display may include detecting which plurality of nodes in the hierarchy of nodes is under a mouse icon hovering on the display.

The one of the test cases may comprise a plurality of test cases. The systems, methods and computer program products may be further configured to determine the plurality of tests cases to be executed by one of: receiving a user selection of the plurality of tests cases and receiving, from the server via the network, a list of default test cases to be executed, to receive, responsive to transmitting, to the server via the network, the message having an indication to execute one of the test cases displayed to test the source code, receive, from the server via the network, one of: an indication of which of the plurality of test cases that passed and an indication of which of the plurality of test cases that failed, and to display, on the display, one of: an indication of the test cases that passed and an indication of test cases that failed.

Each of the plurality of test cases has a flow path associated with the test case and to display, on the display, the one of: the indication of the test cases that passed and the indication of test cases that failed may include displaying a plurality of flow paths associated with the plurality of test cases, each of the plurality of flow paths flowing from the node to another node in the hierarchy of nodes, providing an indication of which of the plurality of flow paths has an associated test case that failed; and responsive to receiving an indication of a user selection of a node along one of the plurality of flow paths that has an associated test case that failed, displaying test cases associated with the one of the plurality of flow paths.

The one of the test cases may comprise a plurality of test cases. The systems, methods and computer program products may be further configured to receive a change in source code, to store the changed source code, to provide the changed source code to the server via the network, to transmit, to a server via a network, a second message having an indication to execute the plurality of test cases based on the changed source code, responsive to transmitting, to the server via the network, the second message having an indication to execute the plurality of test cases, to receive, from the server via the network, one of: a first indication of which test cases passed and a first indication of which test cases failed, and to display, on the display, one of: an indication of which test cases passed and an indication which test cases failed.

Each block of source code represented by one of the nodes in the hierarchy of nodes may have a plurality of uniform resource locators (URLs) each connecting the block of source code to an other block of source code represented by an other one of the nodes in the hierarchy of nodes. The systems, methods and computer program products may be further configured to linking each uniform resource locator (URL) connecting the block of source code to the other block of source code, and to create the sitemap comprising the hierarchy of nodes based on the linking of the URLs.

In an alternate embodiment, systems, methods and computer program products are configured to for each block of source code of a plurality of blocks of source code of program source code of a program: determine uniform resource locators (URLs) linking the block of source code with other blocks of source code of the plurality of blocks of source code of the program source code for the program; associate a node to the block of source code to pictorially represent the block of source code; and link each node to other nodes representing the other blocks of source code based on the URLs, to generate a sitemap comprising a hierarchy of nodes representing the plurality of blocks of source code based on the linking of each node to the other nodes, responsive to receiving a request for the sitemap from a client device via a user interface of the server device, to transmit the sitemap to the client device for the client device to display the sitemap on a display of the client device, to receive an indication of a user selected node on the display of the client device, responsive to receiving the indication of the user selected node, to transmit, via the communication interface, a list of test cases to be executed to test the block of source code represented by the user selected node, to receive, via the communication interface, an indication of a test case to be executed, to execute the test case, and to transmit, via the communication interface, one of a pass indication if the execution of the test case passed and a failure indication if the execution of the test case failed.

The systems, methods and computer program products may be further configured to determine for each node in the hierarchy of nodes that require tests cases to be run when a change is made to the block of source code represented by the node, the list of test cases to be executed to test the block of source code represented by the node.

Receiving an indication of a selected node may include receiving an indication of a plurality of selected nodes. The systems, methods and computer program products may be further configured to receive an indication that the plurality of nodes was selected, to determine a lowest node of the plurality of nodes that is located at a lowest level of the hierarchy of nodes, to identify the lowest node as a user selected node, to determine the list of test cases for the user selected node, and to transmit, via the communication interface, the list of test cases for the user selected node to the client device.

The one test case may be a plurality of test cases. The systems, methods and computer program products may be further configured to responsive to receiving a message identifying the plurality of test cases, the message having an indication to execute the plurality of tests cases, execute the plurality of tests cases, and to transmit, to the device via the communication interface, at least one of an indication of which of the plurality of test cases that passed and an indication of which of the plurality of test cases that failed.

The systems, methods and computer program products may be further configured to receive a change in the block of source code, to receive a second message having an indication to execute the plurality of test cases, and to transmit, to the device via the communication interface, at least one of: a first indication of which test cases of the plurality of test cases passed and a first indication of which test cases of the plurality of test cases failed.

The test case may be a plurality of test cases, each of the plurality of test cases having a flow path associated with the test case and the systems, methods and computer program products may be further configured to determine a plurality of flow paths associated with the plurality of test cases, each of the plurality of flow paths flowing from the node to another node in the hierarchy of nodes, to determine which flow paths of the plurality of flow paths has an associated test case that failed and which flow paths of the plurality of flow paths has an associated test case that passed, to generate the sitemap to show the plurality of flow paths from the node to other nodes in the hierarchy of nodes with the flow paths of the plurality of flow paths having an associated test case that failed to be displayed differently than the flow paths of the plurality of flow paths having an associated test case that passed, and to send the sitemap with the plurality of flow paths to the client device for display on the display of the client device.

It is noted that aspects of the inventive concepts described with respect to one embodiment may be incorporated in a different embodiment although not specifically described relative thereto. That is, all embodiments or features of any embodiments can be combined in any way and/or combination. These and other objects or aspects of the present inventive concepts are explained in detail in the specification set forth below.

The advantages provided by the present inventive concepts include faster and easier selection of regression test cases to execute via the selection on the sitemap. Using the sitemap to select regression test cases reduces or eliminates the need to go through the test case categories, test cases, and the like, and review and select regression test cases to be executed. All of the required test cases are provided in the list of test cases resulting in no human error of missing any test case. By only listing the required test cases, verification of code fixes and/or changes use only the required test cases, thereby eliminating unnecessary tests to be run.

Other systems, methods, or computer program products, and advantages will be or become apparent to one with skill in the art upon review of the following drawings and detailed description. It is intended that all such additional systems, methods, or computer program products and advantages be included within this description, be within the scope of the present inventive concepts, and be protected by the accompanying claims.

BRIEF DESCRIPTION OF THE DRAWINGS

The accompanying drawings are included to provide a further understanding of the disclosure and are incorporated in and constitute a part of this application. In the drawings:

FIG. 1 is a block diagram illustrating a client device and a server according to some embodiments.

DETAILED DESCRIPTION OF EMBODIMENTS

Figure 2A:
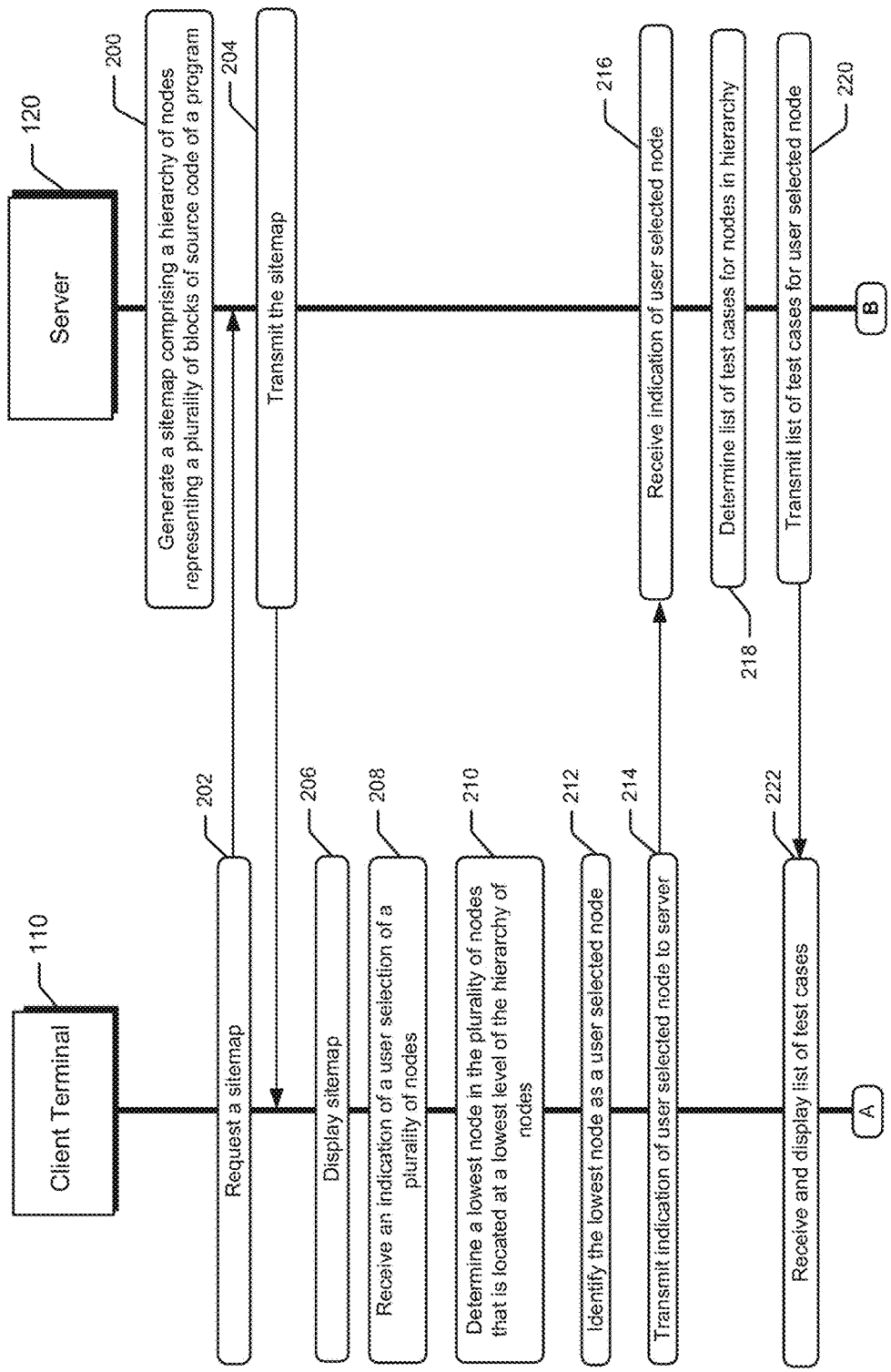
FIGS. 2A-2B are an exemplary signaling diagram for illustrating procedures according to an embodiment.

Embodiments of the present inventive concepts now will be described more fully hereinafter with reference to the accompanying drawings. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "or" is used nonexclusively to include any and all combinations of one or more of the associated listed items.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes" or "including" when used herein, specify the presence of stated features, integers, steps, operations, elements, or components, but do not preclude the presence or addition of one or more other features, integers, steps, operations, elements, components, or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments described herein provide systems or methods for selecting and executing test cases for use in regression testing of software. According to some embodiments, a hierarchy of nodes is displayed on a display of a device where each node of the hierarchy of nodes represents a block of source code for a program. Responsive to a user selection of a plurality of nodes, a lowest node in the plurality of the nodes that is located at a lowest level of the hierarchy of the nodes is determined and identified as a user selected node. Responsive to a user selection of a test case from the list of test cases displayed, a message is sent to a server device to execute the test case.

FIG. 1 is a block diagram illustrating a client-server system for the testing of software programs according to an embodiment. As shown, a server 100 may include a network interface 102, a processor 104, and storage 106. The storage 106 stores the software programs. The processor 104 performs operations in the server 100. The server 100 communicates with client device 110 via network interface 102 through network 122 to the network interface 118 of client device 110. The connection between the network 122 to the network interface 118 may be a wireless connection via radio access network 120 or be a hardwired connection. The network 122 may be a local area network, a wide area network, the Internet, or a combination thereof.

The client device 100 may include a variety of features including a speech interface 112, a display 114, a display interface 116, and the network interface 118. The speech interface 112 receives audio input from a user of the client device 110. The display interface 116 controls the display 114. A processor (not shown) performs operations in the client device 100.

Figure 2B:
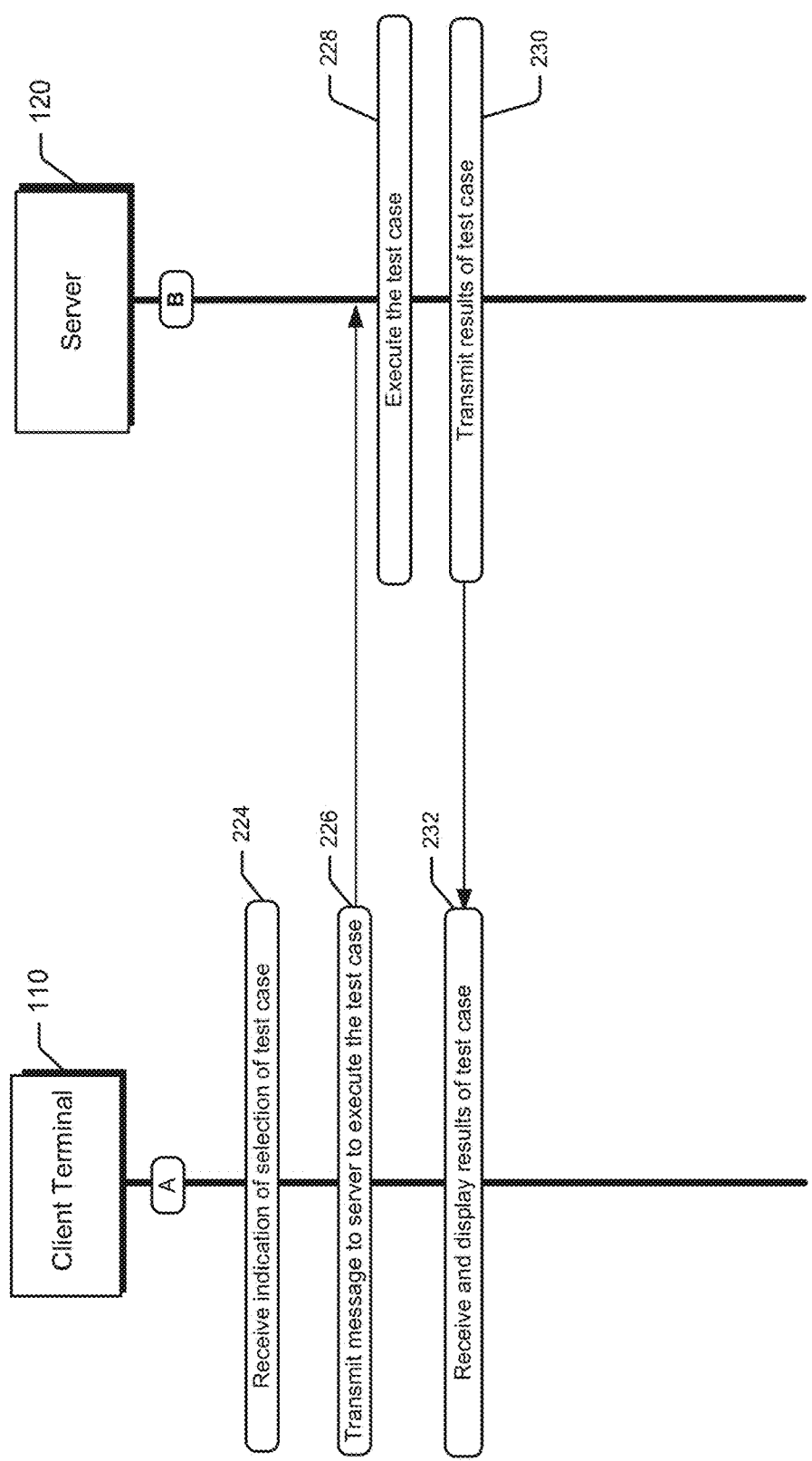
Figure 3:
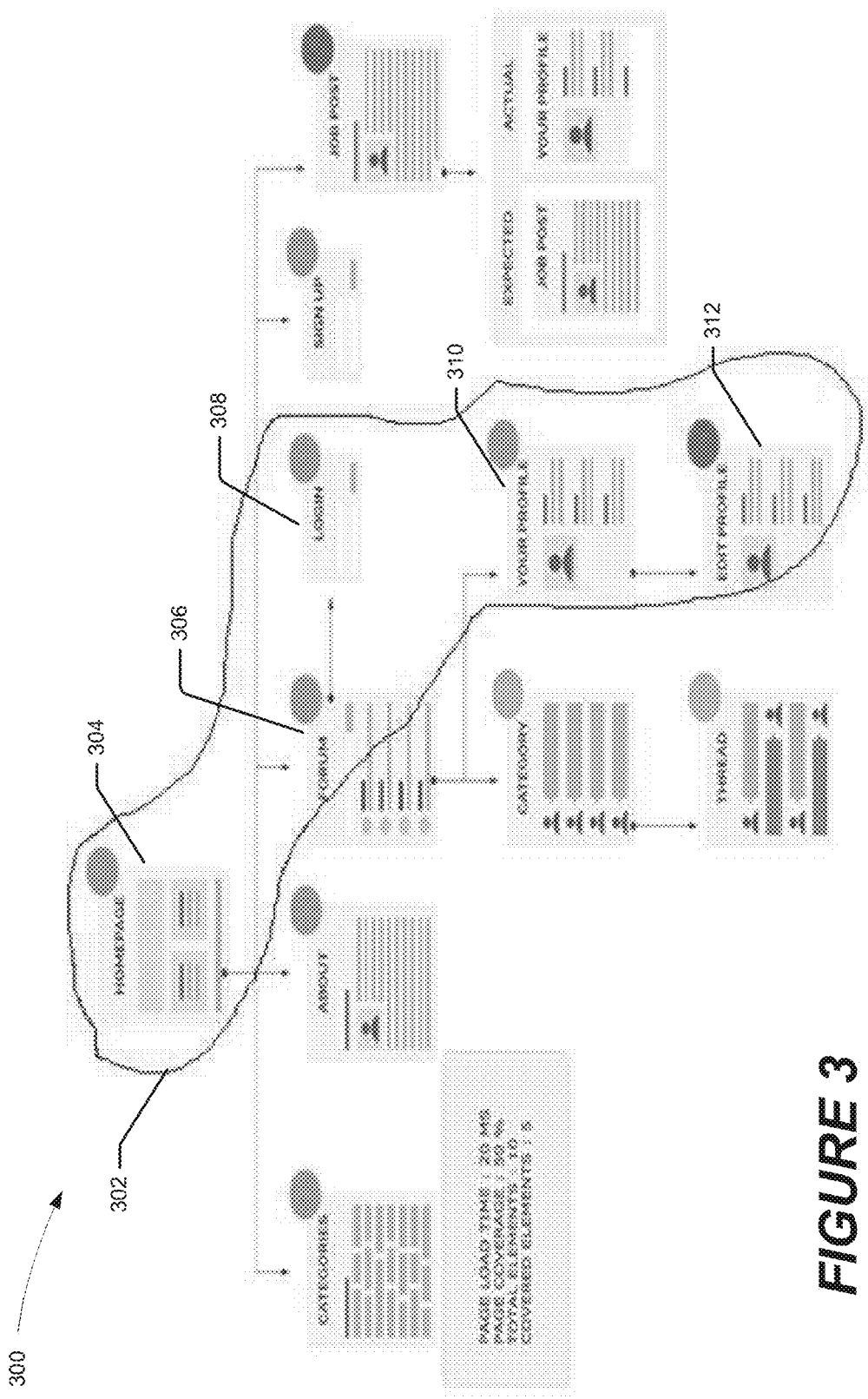
FIG. 3 is a block diagram illustrating a user gesture selecting a plurality of nodes according to some embodiments.

FIGS. 2A and 2B are a signaling diagram of an exemplary procedure that includes selecting nodes and test cases for a block of source code for a program. The procedures of FIGS. 2A and 2B involve the server 100 and the client device 110. Initially, at step 200, the server 120 generates a sitemap that has a hierarchy of nodes. Each node represents a block of source code for a program. An example of a sitemap 300 is shown in FIG. 3.

Figure 4:
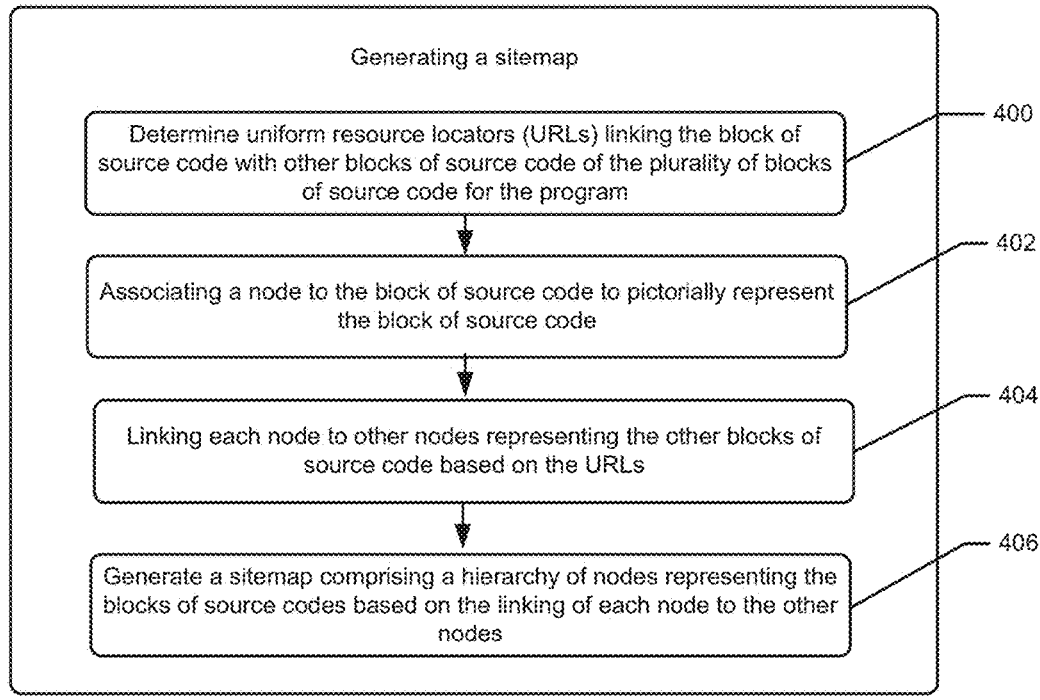
FIG. 4 is a flowchart illustrating operations involving creating a sitemap according to some embodiments.

The sitemap is generated by the server in one embodiment using routes. Turning to FIG. 4, for each block of source code of a plurality of blocks of source code of a program, uniform resource locators (URLs) linking the block of source code to other blocks of source code of the plurality of blocks of source code is determined at step 400. At step 402, a node is associated to block of source code to pictorially represent the block of source code. An example of a node is illustrated in FIG. 3 where nodes 304-312 each pictorially represent a block of source code. At step 404, each node representing a block of source code is linked to other nodes representing the other block of source code based on the URLs. The sitemap of the hierarchy of nodes representing the blocks of source codes is generated at step 406 based on the linking of each node to the other nodes.

Turning back to FIG. 2A, the client device 110 requests the sitemap at step 202. The server 100 transmits the sitemap to the client device 110 through the network 122 via the network interface 102. The client device 110 displays the sitemap at step 206.

Figure 5:
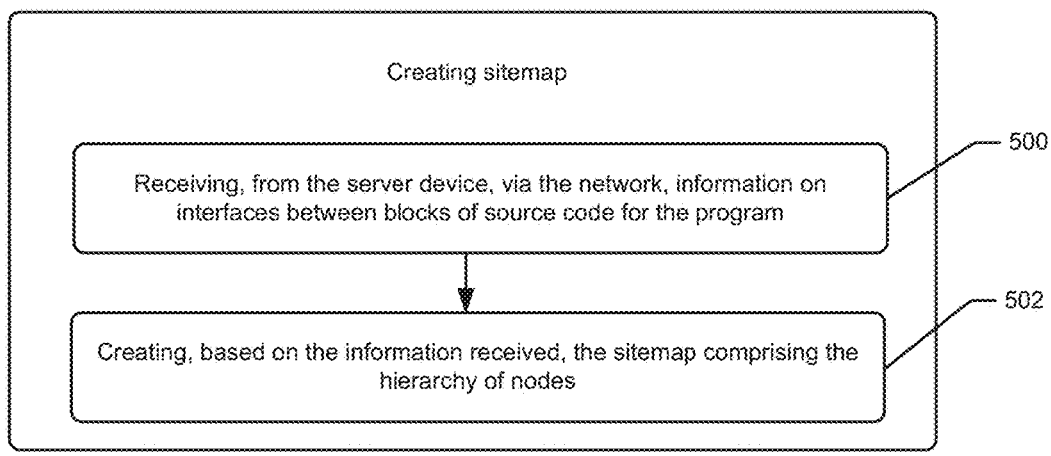
FIG. 5 is a flowchart illustrating operations involving creating a sitemap according to some embodiments.
Figure 6:
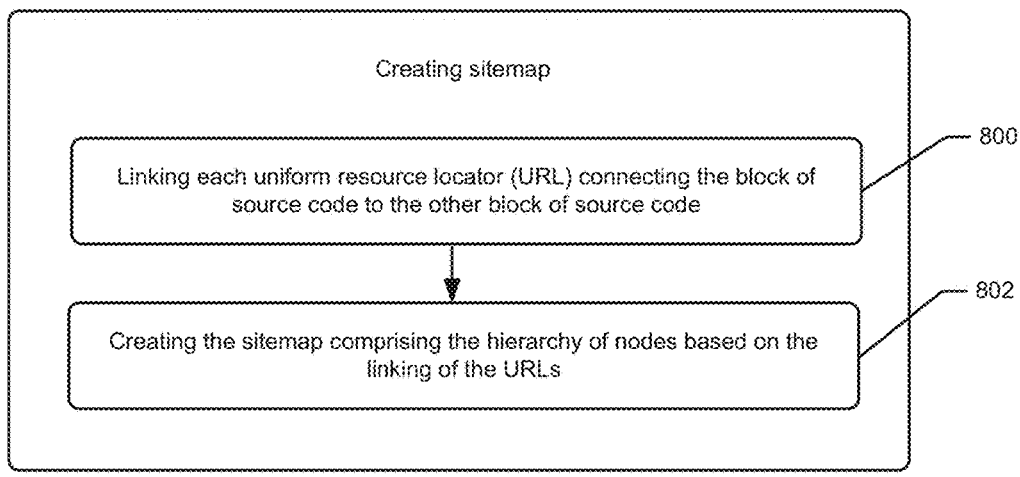
FIG. 6 is a flowchart illustrating operations involving creating a sitemap according to some embodiments.

In an alternate embodiment, the client device 110 creates the sitemap. Turning to FIG. 5, at step 500, the client device 110 receives, from the server 100 via the network interface 118 and network 122, information on interfaces between blocks of source code for the program. At step 502, the sitemap of the hierarchy of nodes is created based on the information received. In one embodiment, the information includes uniform resource locators. Each block of source code represented by one of the nodes in the hierarchy of nodes has a plurality of uniform resource locators (URLs) each connecting the block of source code to another block of source code represented by another one of the nodes in the hierarchy of nodes. Turning to FIG. 6, at step 600, the client device 110 links each uniform resource locator (URL) connecting a block of source represented by a node to the other blocks of source code represented by other nodes. At step 602, the sitemap is created based on the linking of the URLs. For example, the sitemap is created by linking each node to other nodes by the URLs.

At step 208, an indication of a user selection of a plurality of nodes of the hierarchy of nodes is received. The user selection may be accomplished using different techniques.

Figure 7:
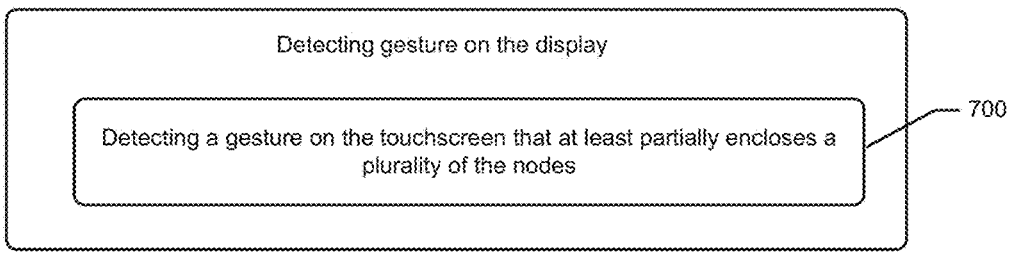
FIG. 7 is a flowchart illustrating operations involving detecting a gesture on a touchscreen according to some embodiments.

In one technique, the display 114 of the client device 110 is a touch screen display. The user selects the plurality of nodes by enclosing or partially enclosing a plurality of nodes on the touchscreen with a finger gesture. Turning to FIG. 7, at step 700, the indication of the user selection is accomplished by detecting the gesture on the touchscreen that encloses or at least partially encloses a plurality of the nodes. FIG. 3 provides an example of detecting a gesture on the touchscreen that started at some point on line 302 and finished at or near that point.

Figure 8:
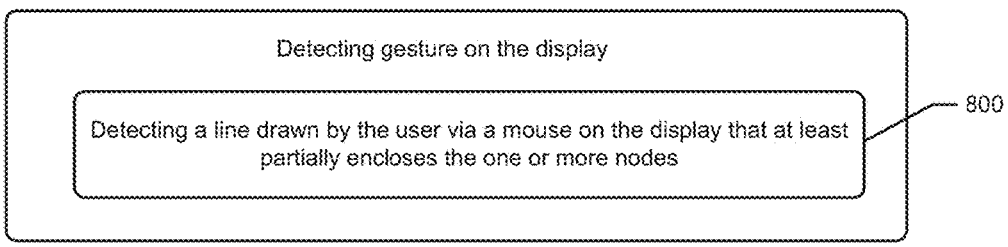
FIG. 8 is a flowchart illustrating detecting a gesture on a touchscreen according to some embodiments.

In another technique, the user selects the plurality of nodes by using a mouse to draw a line that encloses or partially encloses the plurality of nodes. Turning to FIG. 8, at step 800, the indication of the user selection is detecting a line drawn by the user via the mouse on the display that at least partially encloses the one or more nodes. FIG. 3 provides an example where a user draws line 302 on the display.

Figure 9:
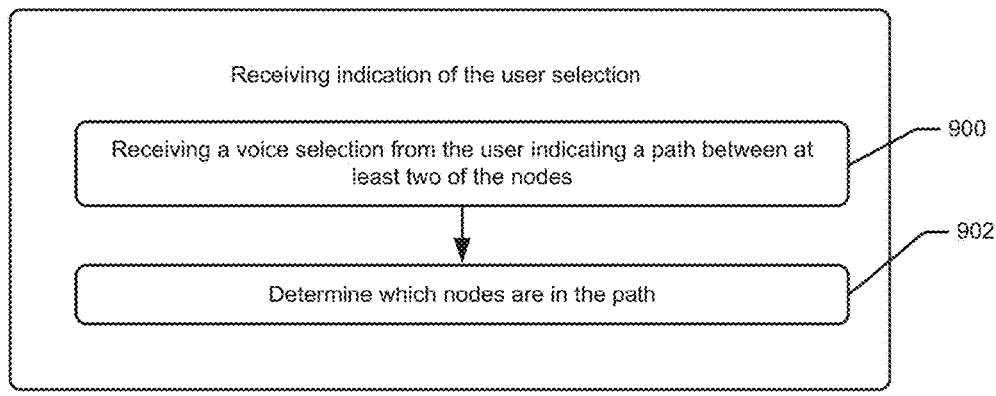
FIG. 9 is a flowchart illustrating involving receiving an indication of a user selection of nodes according to some embodiments.

In another technique, the user indicates a path between at least two nodes on the screen by voicing the path. Turning to FIG. 9, at step 900, the speech interface 112 receives the voice selection for the user indicating a path between at least two of the nodes. The client device 110 determines which nodes are in the path at step 902.

Figure 10:
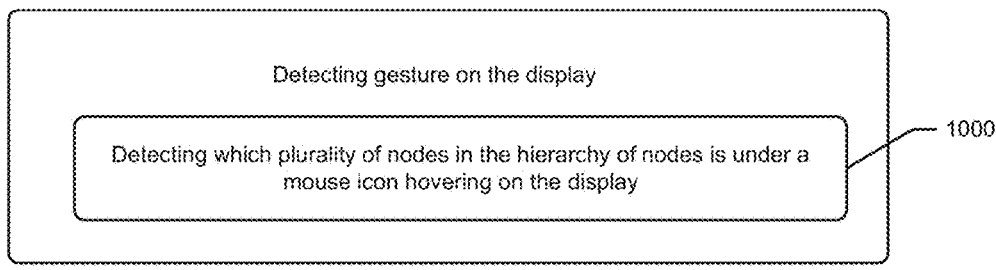
FIG. 10 is a flowchart illustrating operations involving detecting a gesture on a display according to some embodiments.

In another technique, the user hovers a mouse icon on the display. Turning to FIG. 10, at step 1000, the indication of the user selection is detecting which plurality of nodes in the hierarchy of nodes is under a mouse icon hovering on the display.

Returning to FIG. 2A, at step 210, the lowest node in the plurality of nodes that is located at the lowest level of the hierarchy of nodes is determined. For example, FIG. 3 illustrates that nodes 304 to 312 are the plurality of nodes selected. Node 312 is the lowest node in the plurality of nodes that is located at the lowest level of the hierarchy of nodes. At step 212, the lowest level is identified as a user selected node.

Figure 11:
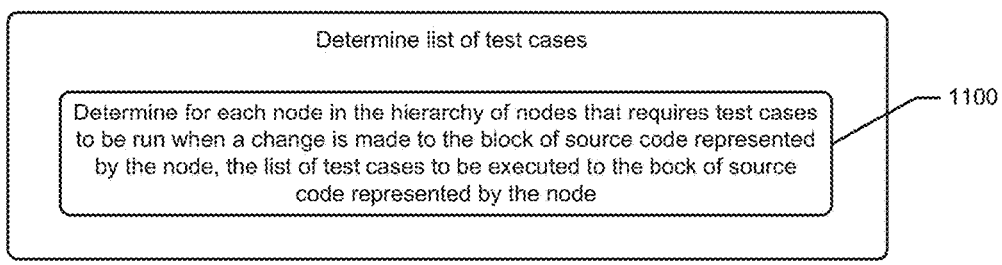
FIG. 11 is a flowchart illustrating operations involving determining a list of test cases according to some embodiments.

At step 214, an indication of the user selected node is transmitted to the server 100. At step 216, the server 100 receives the indication. At step 218, a list of test cases for nodes in the hierarchy of nodes is determined. The test cases in the list of test cases for the nodes are the required test cases to verify the source code represented by the nodes. In one embodiment, the list of test cases was determined when the program represented by the blocks of source code was created. Turning to FIG. 11, in another embodiment, the list is determined by determining for each node in the hierarchy of nodes that requires test cases to be run when a change is made to the block of source code represented by the node, the list of test cases to be executed to the bock of source code represented by the node. The list of test cases for the user selected node is selected and transmitted to the client device at step 220. The test cases in the list of test cases for the user selected node are the required test cases for the user selected node.

Figure 12:
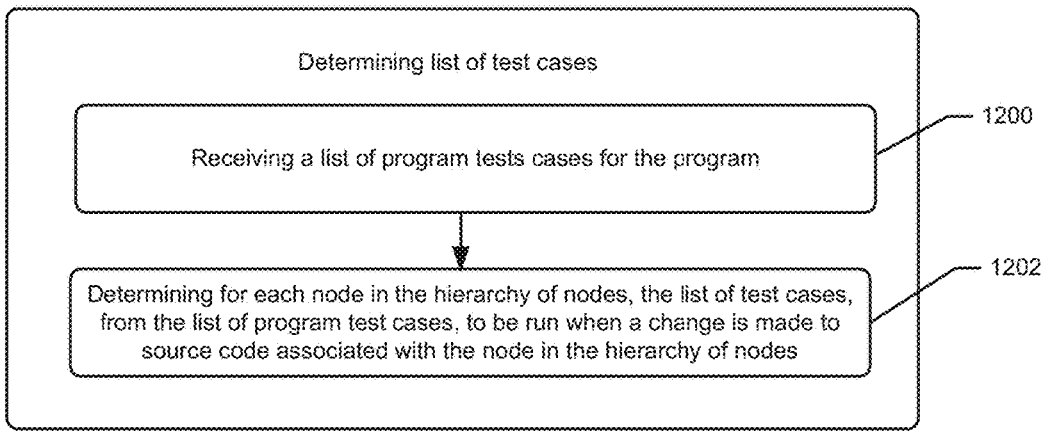
FIG. 12 is a flowchart illustrating operations involving determining a list of test cases according to some embodiments.

In a further embodiment, the client device 110 may determine the list of test cases. Turning to FIG. 12, at step 1200, the client device 110 receives a list of program tests cases for the program. The list may be received from the server 100 or from another server or device. At step 1201, for each node in the hierarchy of nodes, the list of test cases, from the list of program test cases, to be run when a change is made to source code associated with the node in the hierarchy of nodes is determined.

Figure 13:
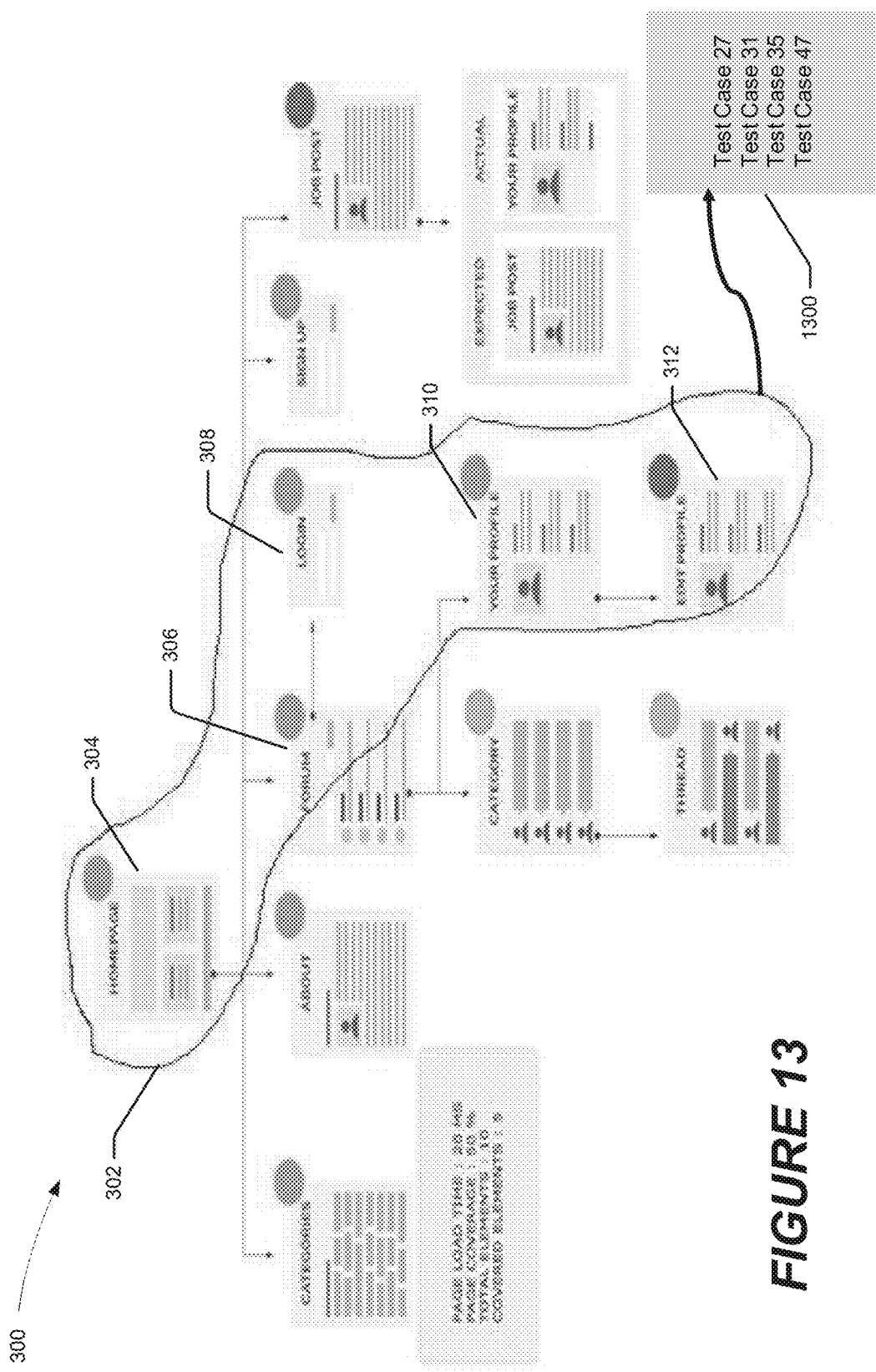
FIG. 13 is a block diagram illustrating operations involving selecting a plurality of nodes according to some embodiments according to some embodiments.

Returning to FIG. 2A, at step 222, if the server 100 determines the list of test cases, the list of test cases for the user selected node are received. The list of test cases for the user selected node is displayed. Turning to FIG. 13, the list of test cases 1300 for the selected node 312 is displayed. In an embodiment, a selection of a node in the hierarchy of nodes results in the list of test cases for that node are displayed.

Figure 14:
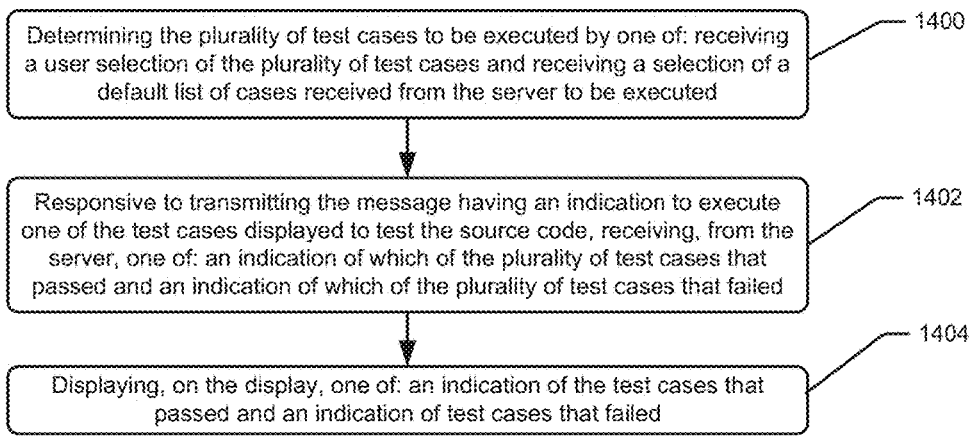
FIG. 14 is a flowchart illustrating operations involving execute executing test cases according to some embodiments.
Figure 15:
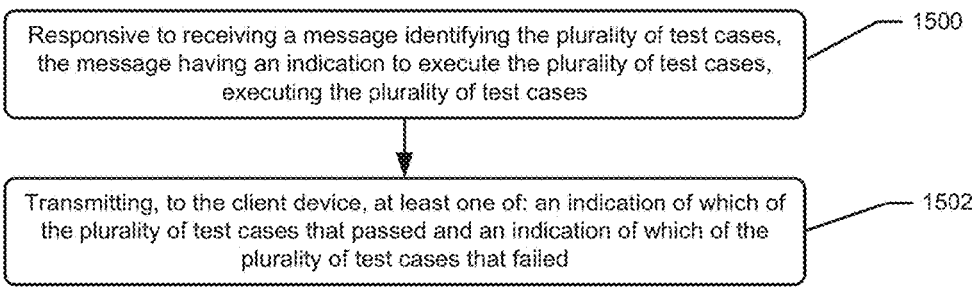
FIG. 15 is a flowchart illustrating operations to execute test cases according to some embodiments.

Returning to FIG. 2B, at step 224, an indication of a selection of a test case to be executed by the server is received. At step 226, a message is transmitted to the server 100 to execute the test case selected by the user. The server 110 executes the test case at step 228. At step 230, the results of the test case are transmitted to the client device 110. More than one test case may be selected by the user and be executed by the server. For example, a default list of test cases to be run may be received from the server. The user may select the default list of test cases to be executed by the server. Turning to FIG. 14, at step 1400, a plurality of test cases to be executed by the server is determined by receiving a user selection of a plurality of test cases or a selection of the default list of test cases received from the server. The test cases listed in the default list of test cases received from the server are the required test cases to test the user selected node. At step 1402, responsive to transmitting the message having an indication to execute the one of the test cases displayed to test the source code, the client device 110 receives from the server 100 an indication of which of the plurality of test cases that passed and/or an indication of which of the plurality of test cases that failed. Turning to FIG. 15, at the server 100, the server 100 receives a message from the client device 110 that identifies the plurality of test cases selected and that has an indication to execute the plurality of test cases. The server 100 executes the plurality of test cases responsive to receiving the message at step 1500. At step 1502, the server 100 transmits to the client device, an indication of which the test cases that passed and/or an indication of which of the plurality of test cases that failed.

Figure 16:
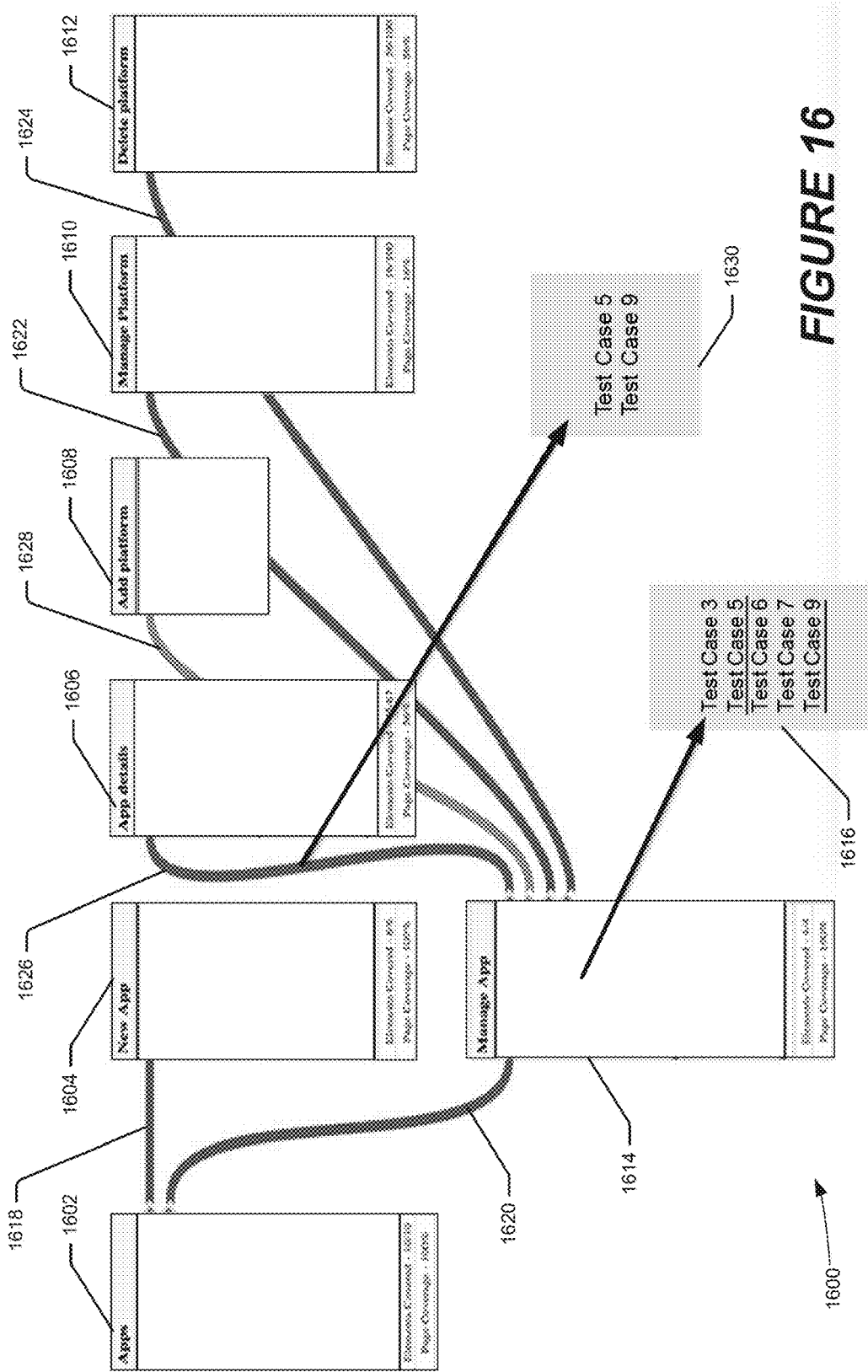
FIG. 16 is a block diagram illustrating selecting a flow path according to some embodiments.

Returning to FIG. 2B, at step 232, the client device 110 receives the results and displays the results. The displayed results are illustrated, for example in FIG. 16. As shown in FIG. 16, the sitemap 1600 has a plurality of nodes selected that are represented by nodes 1602-1614. The indication of which tests passed and/or which tests failed can be displayed in a variety of ways. For example, the list of test cases 1616 that were executed may have the test cases that failed being underlined, have a different color, a different shape, etc.

Figure 17:
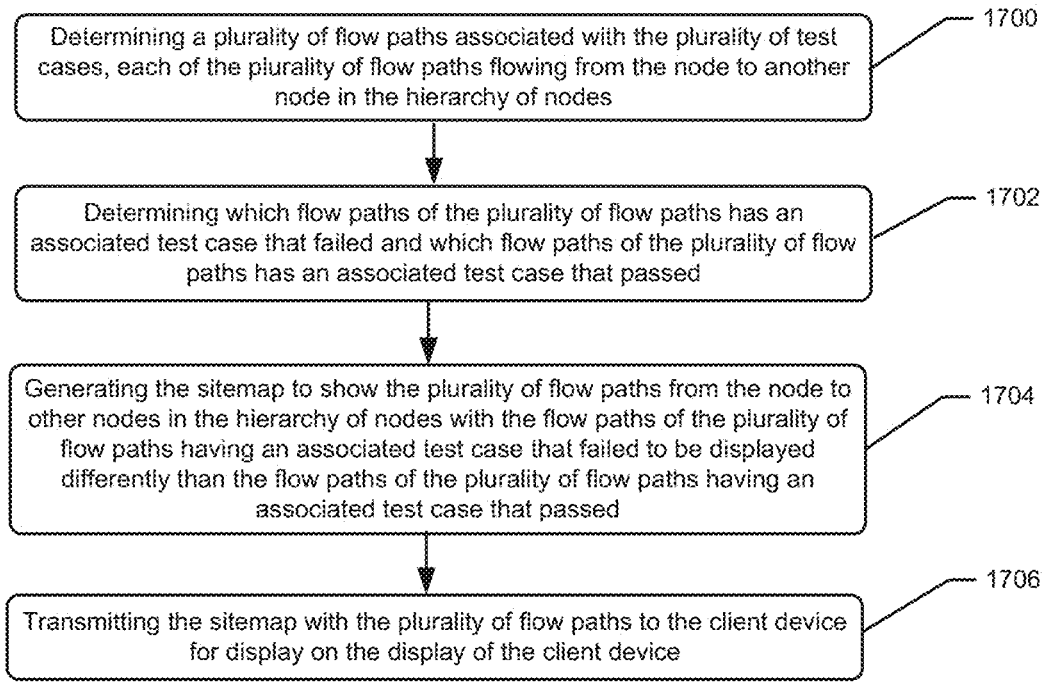
FIG. 17 is a flowchart illustrating operations of executing test cases and providing test case results according to some embodiments.

In one embodiment flow paths are used to also show which links to other nodes failed. A flow path is a path from one node to another node. Operations to determine which flow paths failed are illustrated, for example in FIG. 17. At step 1700, a plurality of flow paths associated with the plurality of test cases selected are determined. Each of the flow paths flows from the user selected node to another node in the hierarchy of nodes that are associated with the plurality of test cases. At step 1702, a determination of which flow paths of the plurality of flow paths has an associated test case that failed and/or which flow paths of the plurality of flow paths has an associated test case that passed. At step 1704, the sitemap is generated to show the plurality of flow paths from the node to other nodes in the hierarchy of nodes with the flow paths of the plurality of flow paths having an associated test case that failed to be displayed differently than the flow paths of the plurality of flow paths having an associated test case that passed. At step 1706, the sitemap with the plurality of flow paths is transmitted to the client device 110 for display on the display of the client device 110.

Figure 18:
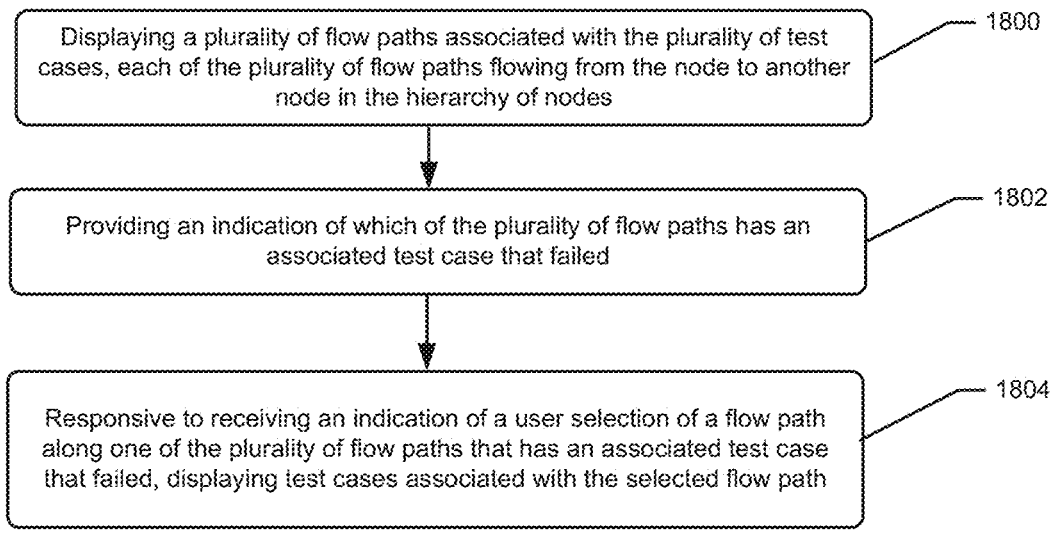
FIG. 18 is a flowchart illustrating operations involving flow paths according to some embodiments.

Operations to show which flow paths failed are illustrated, for example, in FIG. 18. At step 1800, the client device 110 receives and displays the sitemap having the plurality of flow paths associated with plurality of test cases. Each of the flow paths flows from the user selected node to another node in the hierarchy of nodes that are associated with the plurality of test cases. At step 1802, an indication of which of the plurality of flow paths has an associated test case that failed. The indication may be a flow path having a different color, a different shape, a different line weight, a different type of line such as a dashed line, etc. At step 1804, responsive to receiving an indication of a user selection of a flow path along one of the plurality of flow paths that has an associated test case that failed, test cases associated with the selected flow path are displayed.

FIG. 16 illustrates the flow paths associated with the test cases for the user selected node 1614. The flow paths 1618-1626 are flow paths associated with the selected test cases. Flow paths 1618-1624 are flow paths associated with test cases that passed and flow path 1626 is a flow path associated with test cases that failed. Flow path 1628 is a flow path that is not associated with the selected test cases. When a user selects flow path 1626 that failed, the list 1630 of test cases that failed are displayed. When a user selects a flow path that passed, the list of test cases for that path are displayed.

Figure 19:
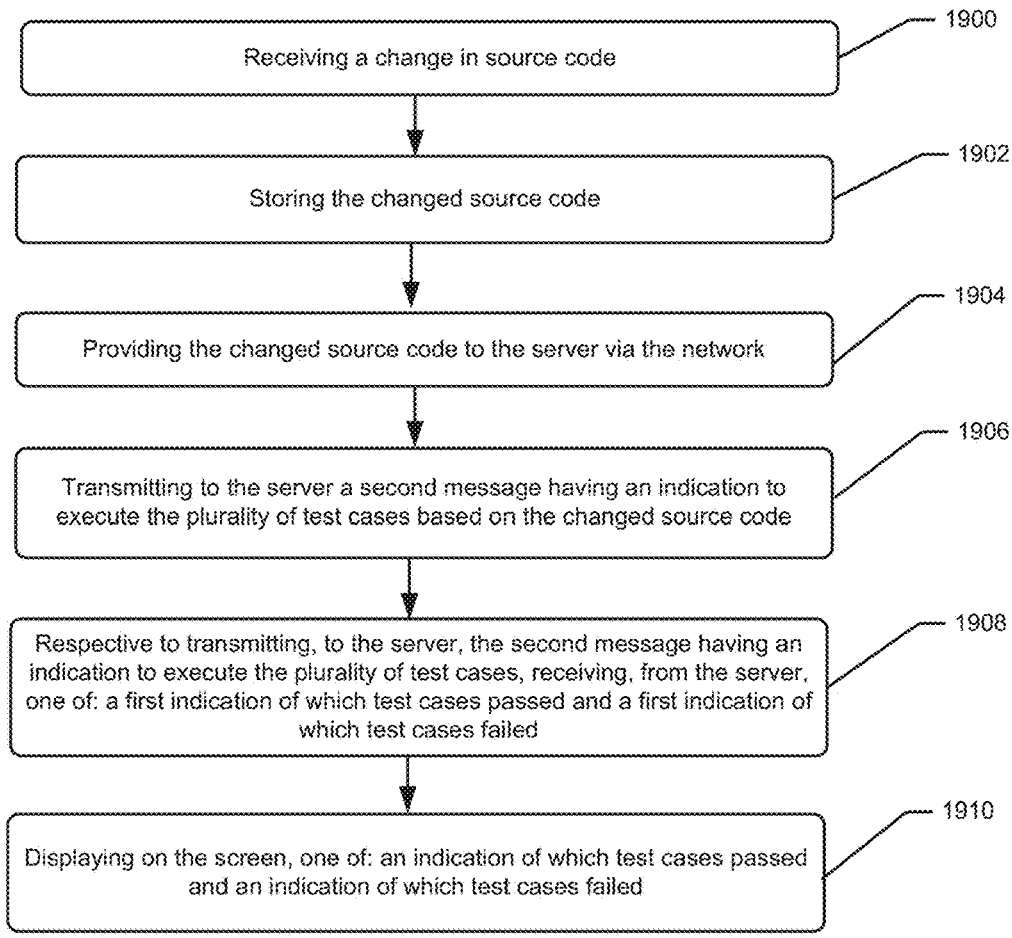
FIG. 19 is a flowchart illustrating operations involving source code changes according to some embodiments.

When a block of source code of a program is changed, regression testing for the block of source code is typically performed. The operations and techniques described above can be used. Operations according to further embodiments are illustrated in the flowchart of FIG. 19. As shown therein, the operations include receiving a change in source code at step 1900. At step 1902, the changed source code is stored at client device 110. The changed source code is provided to the server 100 via the network 120 at step 1904. At step 1906, a message having an indication to execute the plurality of test cases based on the changed source code is transmitted to the server 100. At step 1908, respective to transmitting, to the server, the second message having an indication to execute the plurality of test cases, the client device 110 receives, from the server 110, one of: a first indication of which test cases passed and a first indication of which test cases failed. At step 1910, the client device 110 displays on the screen, an indication of which test cases passed and/or an indication of which test cases failed.

Figure 20:
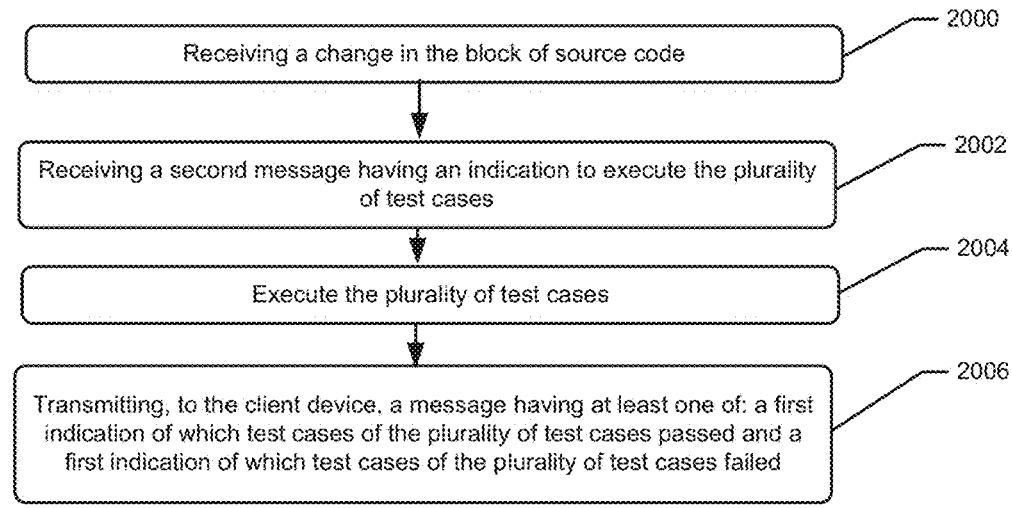
FIG. 20 is a flowchart illustrating operations involving source code changes according to some embodiments.

Operations the server 110 performs when the block of source code of the program are illustrated in the flowchart of FIG. 20. At block 2000, a change in the block of source code is received. At block 2002, a message from the client device 110 having an indication to execute the plurality of test cases is received. At block 2004, the plurality of test cases is executed. At block 2006, a message is transmitted to the client device 110 having an indication of which test cases of the plurality of test cases passed and/or an indication of which test cases of the plurality of test cases failed.

Figure 21:
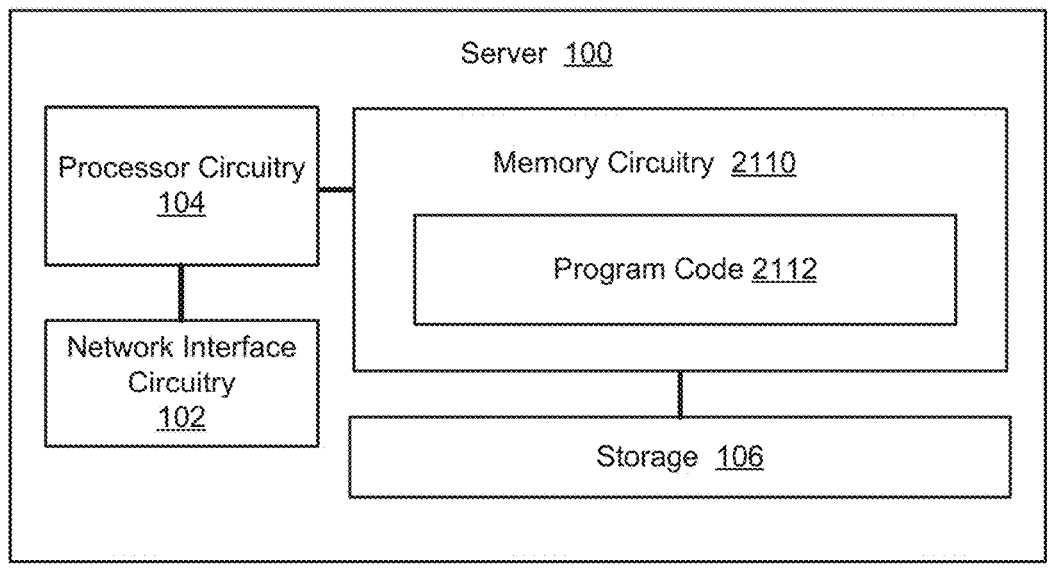
FIG. 21 is a block diagram illustrating a server according to some embodiments.

FIG. 21 provides an overview diagram of a suitable computer hardware and computing environment in conjunction with which various embodiments of the server 100 may be practiced. The description of FIG. 21 is intended to provide a brief, general description in conjunction with which the invention may be implemented. In some embodiments, the invention is described in the general context of computer-executable instructions, such as program modules, being executed by a computer, such as a personal computer. Generally, program modules include routines, programs, objects, components, data structures, and the like, that perform particular tasks or implement particular abstract data types.

In the embodiment shown in FIG. 21, a hardware and operating environment is provided that is applicable to the server 100 described above. It can be appreciated that the following hardware and operating environment might be used in connection with the development of the software application to be tested, the use and operation of test case automation tools, the use and operation of integrated third party test tools, or the deployment of the software application to be tested.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. As used herein, a "processor" includes one or more processors, microprocessors, computers, co-processors, graphics processors, digital signal processors, arithmetic logic units, system-on-chip processors, etc. The invention may also be practiced in distributed computer environments where tasks are performed by I/O remote processing devices that are linked through a communications network. In a distributed computing environment, program modules may be located in both local and remote memory storage devices.

In the embodiment shown in FIG. 21, a hardware and operating environment is provided that is applicable to the server shown in the other figures. As shown in FIG. 21, one embodiment of the hardware and operating environment includes processing circuitry 104 having one or more processing units coupled to the network interface circuitry 102 and a memory circuitry 2210. The memory circuitry 2210 may include a ROM, e.g., a flash ROM, a RAM, e.g., a DRAM or SRAM, or the like and includes suitably configured program code 2212 to be executed by the processing circuitry so as to implement that above described functionalities of the server. The storage 106 may include a mass storage, e.g., a hard disk or solid state disk, or the like. There may be only one or more than one processing unit, such that the processor circuitry 104 of server 100 comprises a single central-processing unit (CPU), or a plurality of processing units, commonly referred to as a multiprocessor or parallel-processor environment. A multiprocessor system can include cloud computing environments.

Figure 22:
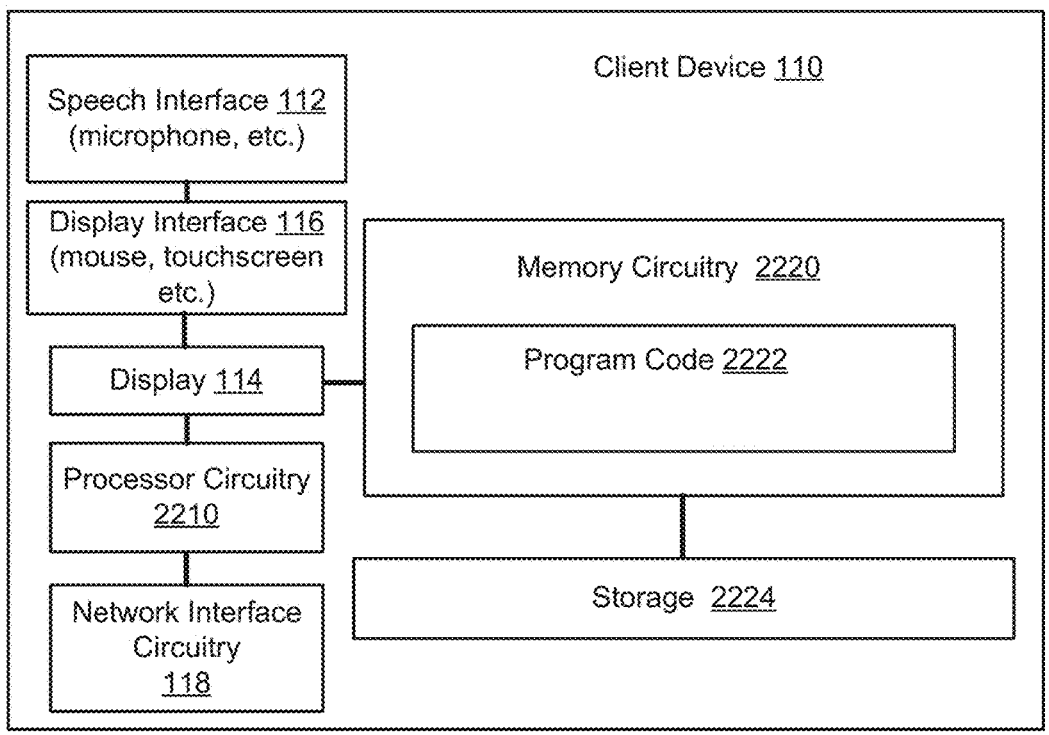
FIG. 22 is a block diagram illustrating a client device according to some embodiments.

FIG. 22 provides an overview diagram of a suitable computer hardware and computing environment in conjunction with which various embodiments of the client device 110 may be practiced. The description of FIG. 22 is intended to provide a brief, general description in conjunction with which the invention may be implemented. In some embodiments, the invention is described in the general context of computer-executable instructions, such as program modules, being executed by a computer, such as a personal computer. Generally, program modules include routines, programs, objects, components, data structures, and the like, that perform particular tasks or implement particular abstract data types.

In the embodiment shown in FIG. 22, a hardware and operating environment is provided that is applicable to the client device operations described in the other figures and described above. It can be appreciated that the following hardware and operating environment might be used in connection with the development of the software application to be tested, the use and operation of a test case automation tool, the use and operation of integrated third party test tools, or the deployment of the software application to be tested.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. As used herein, a "processor" includes one or more processors, microprocessors, computers, co-processors, graphics processors, digital signal processors, arithmetic logic units, system-on-chip processors, etc. The invention may also be practiced in distributed computer environments where tasks are performed by I/O remote processing devices that are linked through a communications network. In a distributed computing environment, program modules may be located in both local and remote memory storage devices.

In the embodiment shown in FIG. 22, a hardware and operating environment is provided that is applicable to the client device shown in the other figures. As shown in FIG. 22, one embodiment of the hardware and operating environment includes processing circuitry 2210 having one or more processing units coupled to the network interface circuitry 118 and a memory circuitry 2220. The memory circuitry 2220 may include a ROM, e.g., a flash ROM, a RAM, e.g., a DRAM or SRAM, or the like and includes suitably configured program code 2222 to be executed by the processing circuitry so as to implement that above described functionalities of the server. The storage 2224 may include a mass storage, e.g., a hard disk or solid state disk, or the like. There may be only one or more than one processing unit, such that the processor circuitry 2210 of client device 110 comprises a single central-processing unit (CPU), or a plurality of processing units, commonly referred to as a multiprocessor or parallel-processor environment. A multiprocessor system can include cloud computing environments. The speech interface 112 includes interfaces to communicate with microphones and the like. The display 114 may be a monitor, a touchscreen, and the like. Display 114 may include multiple displays. The display interface 116 provides interfaces for other components to connect to the display interface. The other components may be a mouse, a tracking ball, and the like.

Thus, example systems, methods, and tangible machine readable media for identifying test cases for regression testing and performing regression testing using the identified test cases have been described. These systems/methods may be integrated with existing code management tools. The advantages provided include faster and easier selection of regression test cases to execute via the selection on the sitemap. Using the sitemap to select regression test cases reduces or eliminates the need to go through the test case categories, test cases, and the like, and review and select regression test cases to be executed. The required test cases are provided in the list of test cases resulting in no human error of missing any test case. By only listing the required test cases, verification of code fixes and/or changes use only the required test cases, thereby eliminating unnecessary tests to be run.

As will be appreciated by one of skill in the art, the present inventive concepts may be embodied as a method, data processing system, or computer program product. Furthermore, the present inventive concepts may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations or block diagrams of methods, systems and computer program products. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations described herein may be written in an object oriented programming language such as Java® or C++. However, the computer program code for carrying out operations described herein may also be written in conventional procedural programming languages, such as the "C" programming language. The program code may execute entirely on the user's computer, partly on the user's computer, as a standalone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

What is claimed is:

1. A method in a device having a display comprising:
    displaying a sitemap comprising a hierarchy of nodes on the display, each node representing a block of source code for a program;
    receiving an indication of a user selection of a plurality of nodes in the hierarchy of nodes displayed on the display;
    responsive to receiving the indication of the user selection of the plurality of nodes in the hierarchy of nodes on the display:
        determining a lowest node in the plurality of the nodes that is located at a lowest level of the hierarchy of the nodes and designating the lowest node as a user selected node;
        obtaining a list of a plurality of test cases that are determined to be required to be executed when a change is made to a block of source code represented by the user selected node;
    displaying the list of the plurality of test cases that are determined to be required to be executed to test the block of source code represented by the user selected node;
    receiving an indication of a selection of one of the test cases in the list of the plurality of test cases displayed; and
    transmitting, to a server device via a network, a message having an indication to execute the one of the test cases in the list of the plurality of test cases displayed.

2. The method of claim 1, further comprising:
    receiving, from the server device via the network, a list of program test cases for the program;
    determining for each node in the hierarchy of nodes, the list of test cases, from the list of program test cases, to be run when a change is made to source code associated with the node in the hierarchy of nodes; and
    wherein obtaining the list of the plurality of test cases comprises obtaining the list of test cases for the user selected node.

3. The method of claim 1, further comprising:
    receiving, from the server device via the network, information on interfaces between blocks of the source code for the program; and
    creating, based on the information received, the sitemap comprising the hierarchy of nodes.

4. The method of claim 1 wherein the display comprises a touchscreen and receiving the indication of the user selection of the plurality of nodes in the hierarchy of nodes on the display comprises:
    detecting a user gesture on the display that at least partially encloses the plurality of the nodes.

5. The method of claim 4 wherein detecting the user gesture on the touchscreen that at least partially encloses the plurality of the nodes comprises tracking a line drawn by the user via a mouse and or the touchscreen that at least partially encloses the one or more nodes.

6. The method of claim 1 wherein receiving the indication of the user selection of the plurality of nodes in the hierarchy of nodes on the display comprises:
    receiving a voice selection from the user indicating a path between at least two of the nodes; and
    determining which plurality of nodes are in the path.

7. The method of claim 1 wherein receiving the indication of the user selection of the plurality of nodes in the hierarchy of nodes on the display comprises:
    detecting which plurality of nodes in the hierarchy of nodes is under a mouse icon hovering on the display.

8. The method of claim 1 wherein the one of the test cases comprises a plurality of test cases, the method further comprising:
    determining the plurality of tests cases to be executed by one of: receiving a user selection of the plurality of tests cases and receiving, from the server via the network, a list of default test cases to be executed;

responsive to transmitting, to the server via the network, the message having an indication to execute one of the test cases displayed to test the source code, receiving, from the server via the network, one of: an indication of which of the plurality of test cases that passed and an indication of which of the plurality of test cases that failed; and displaying, on the display, one of: an indication of the test cases that passed and an indication of test cases that failed.

9. The method of claim 8 wherein each of the plurality of test cases has a flow path associated with the test case and displaying, on the display, the one of: the indication of the test cases that passed and the indication of test cases that failed comprises:

displaying a plurality of flow paths associated with the plurality of test cases, each of the plurality of flow paths flowing from the node to another node in the hierarchy of nodes;

providing an indication of which of the plurality of flow paths has an associated test case that failed; and responsive to receiving an indication of a user selection of a node along one of the plurality of flow paths that has an associated test case that failed, displaying test cases associated with the one of the plurality of flow paths.

10. The method of claim 1, wherein the one test case comprises a plurality of test cases, the method further comprising:

receiving a change in source code;
storing the changed source code;
providing the changed source code to the server via the network;
transmitting, to a server via a network, a second message having an indication to execute the plurality of test cases based on the changed source code;
responsive to transmitting, to the server via the network, the second message having an indication to execute the plurality of test cases, receiving, from the server via the network, one of: a first indication of which test cases passed and a first indication of which test cases failed; and
displaying, on the display, one of: an indication of which test cases passed and an indication which test cases failed.

11. The method of claim 1, wherein each block of source code represented by one of the nodes in the hierarchy of nodes has a plurality of uniform resource locators (URLs) each connecting the block of source code to an other block of source code represented by an other one of the nodes in the hierarchy of nodes, the method further comprising:

linking each uniform resource locator (URL) connecting the block of source code to the other block of source code; and creating the sitemap comprising the hierarchy of nodes based on the linking of the URLs.

12. A server device comprising:
a processor circuit; and
a memory connected to the processor circuit and storing program instructions that are executed by the processor to perform operations comprising:
for each block of source code of a plurality of blocks of source code of program source code of a program:
determining uniform resource locators (URLs) linking the block of source code with other blocks of source code of the plurality of blocks of source code of the program source code for the program;
associating a node to the block of source code to pictorially represent the block of source code; and
linking each node to other nodes representing the other blocks of source code based on the URLs;
generating a sitemap comprising a hierarchy of nodes representing the plurality of blocks of source code based on the linking of each node to the other nodes;
responsive to receiving a request for the sitemap from a client device via a user interface of the server device, transmitting the sitemap to the client device for the client device to display the sitemap on a display of the client device;
receiving an indication of a user selected node on the display of the client device;
responsive to receiving the indication of the user selected node, transmitting, via the communication interface, a list of test cases to be executed to test the block of source code represented by the user selected node;
receiving, via the communication interface, an indication of a test case to be executed;
executing the test case; and
transmitting, via the communication interface, one of a pass indication if the execution of the test case passed and a failure indication if the execution of the test case failed.

13. The server device according to claim 12, wherein the processor is further configured to perform operations comprising:

determining for each node in the hierarchy of nodes that require tests cases to be run when a change is made to the block of source code represented by the node, the list of test cases to be executed to test the block of source code represented by the node.

14. The server device according to claim 12 wherein receiving an indication of a selected node comprises receiving an indication of a plurality of selected nodes and the processor is further configured to perform operations comprising:

receiving an indication that the plurality of nodes was selected;
determining a lowest node of the plurality of nodes that is located at a lowest level of the hierarchy of nodes;
identifying the lowest node as a user selected node;
determining the list of test cases for the user selected node; and
transmitting, via the communication interface, the list of test cases for the user selected node to the client device.

15. The server device according to claim 12 wherein the one test case comprises a plurality of test cases, and the processor is further configured to perform operations comprising:

responsive to receiving a message identifying the plurality of test cases, the message having an indication to execute the plurality of tests cases, executing the plurality of tests cases; and transmitting, to the device via the communication interface, at least one of an indication of which of the plurality of test cases that passed and an indication of which of the plurality of test cases that failed.

16. The server device according to claim 12, further comprising:

receiving a change in the block of source code;
receiving a second message having an indication to execute the plurality of test cases; and transmitting, to the device via the communication interface, at least one of: a first indication of which test cases of the plurality of test cases passed and a first indication of which test cases of the plurality of test cases failed.

17. The server device according to claim 12 wherein the test case comprises a plurality of test cases, each of the plurality of test cases having a flow path associated with the test case and the processor is further configured to perform the operations comprising:
   determining a plurality of flow paths associated with the plurality of test cases, each of the plurality of flow paths flowing from the node to another node in the hierarchy of nodes;
   determining which flow paths of the plurality of flow paths has an associated test case that failed and which flow paths of the plurality of flow paths has an associated test case that passed;
   wherein generating the sitemap comprising the hierarchy of nodes representing the plurality of blocks of source code based on the linking of each node to the other nodes comprises generating the sitemap to show the plurality of flow paths from the node to other nodes in the hierarchy of nodes with the flow paths of the plurality of flow paths having an associated test case that failed to be displayed differently than the flow paths of the plurality of flow paths having an associated test case that passed; and
   sending the sitemap with the plurality of flow paths to the client device for display on the display of the client device.

18. A computer program product comprising:
   a non-transitory computer readable storage medium comprising computer readable program code embodied in the medium that when executed by at least one processor of a computer system causes the computer system to perform operations comprising:
      for each block of source code of a plurality of blocks of source code of program source code of a program:
         determining uniform resource locators (URLs) linking the block of source code with other blocks of source code of the plurality of blocks of source code of the program source code for the program;
         associating a node to the block of source code to pictorially represent the block of source code; and
         linking each node to other nodes representing the other blocks of source code based on the URLs;
      generating a sitemap comprising a hierarchy of nodes representing the plurality of blocks of source code based on the linking of each node to the other nodes;
      responsive to receiving a request for the sitemap from a client device via a user interface of the server device, transmitting the sitemap to the client device for the client device to display the sitemap on a display of the client device;
      receiving an indication of a user selected node on the display of the client device;
      responsive to receiving the indication of the user selected node, transmitting, via the communication interface, a list of test cases to be executed to test the block of source code represented by the user selected node;
      receiving, via the communication interface, an indication of a test case to be executed;
      executing the test case; and
      transmitting, via the communication interface to the client device, one of a pass indication if the execution of the test case passed and a failure indication if the execution of the test case failed.

19. The computer program product according to claim 18, wherein the test case comprises a plurality of test cases, each of the plurality of test cases having a flow path associated with the test case and wherein the non-transitory computer readable storage medium comprises further computer readable program code embodied in the medium that when executed by at least one processor of a computer system causes the computer system to perform operations comprising:
   determining a plurality of flow paths associated with the plurality of test cases, each of the plurality of flow paths flowing from the node to another node in the hierarchy of nodes;
   determining which flow paths of the plurality of flow paths has an associated test case that failed and which flow paths of the plurality of flow paths has an associated test case that passed;
   wherein generating the sitemap comprising the hierarchy of nodes representing the plurality of blocks of source code based on the linking of each node to the other nodes comprises generating the sitemap to show the plurality of flow paths from the node to other nodes in the hierarchy of nodes with the flow paths of the plurality of flow paths having an associated test case that failed to be displayed differently than the flow paths of the plurality of flow paths having an associated test case that passed; and
   transmitting, via the communication interface, the sitemap with the plurality of flow paths to the client device for display on the display of the client device.

* * * * *